Nov. 3, 1936.  J. A. OBERMAIER  2,059,480
THERMOCOUPLE
Filed Sept. 20, 1933  2 Sheets-Sheet 1
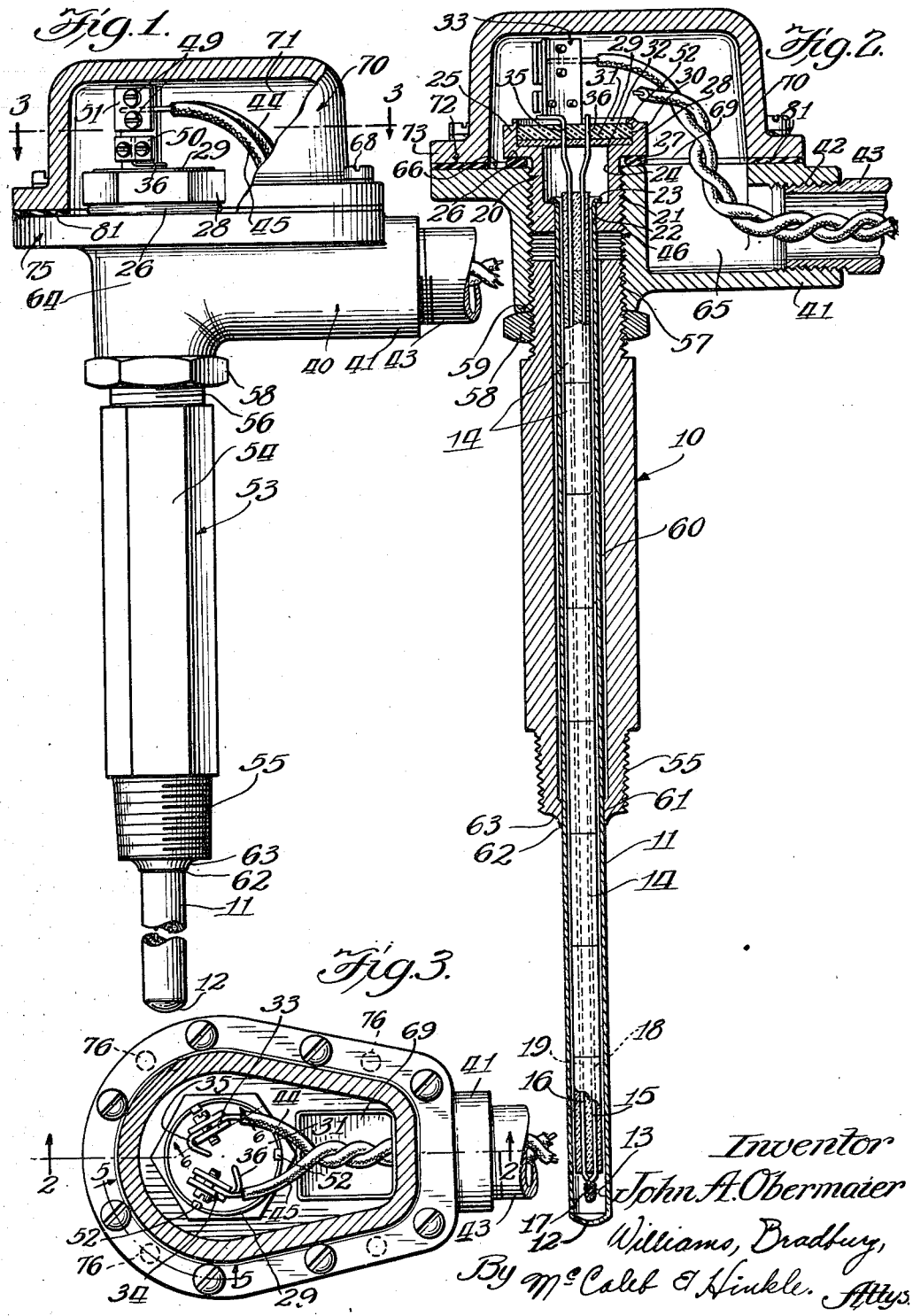

Nov. 3, 1936.  J. A. OBERMAIER  2,059,480
THERMOCOUPLE
Filed Sept. 20, 1933  2 Sheets-Sheet 2
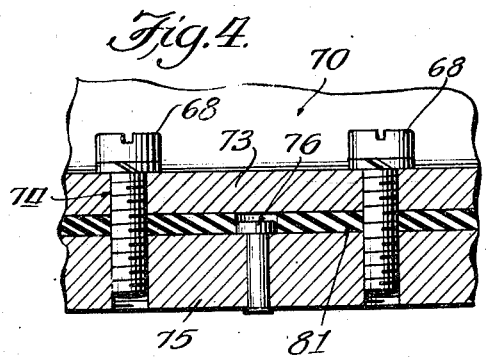
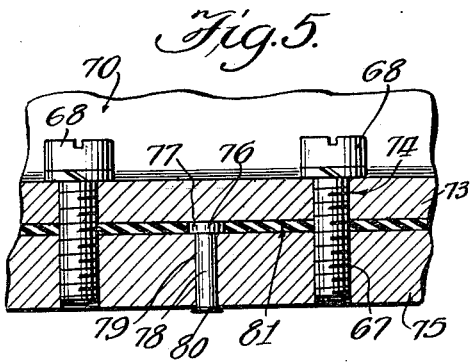
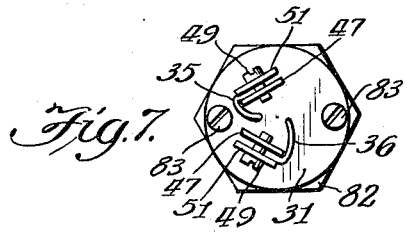
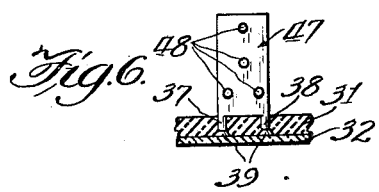
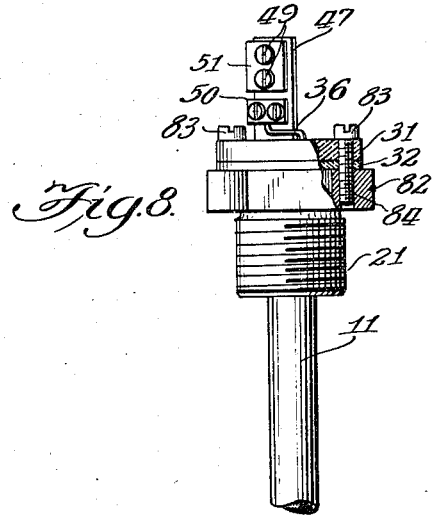
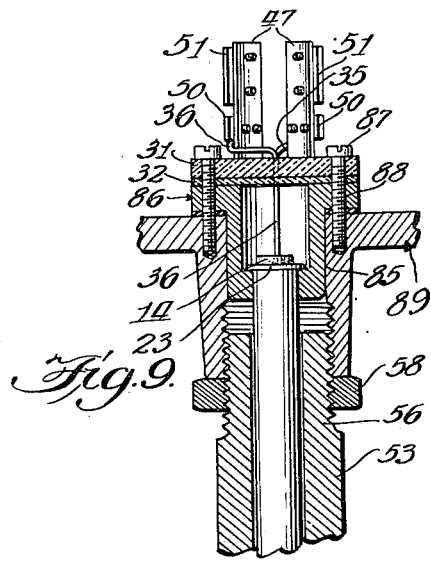
Inventor
John A. Obermaier
By Williams, Bradbury,
McCalel &Hinkle. Attys.

Patented Nov. 3, 1936

2,059,480

UNITED STATES PATENT OFFICE 2,059,480

THERMOCOUPLE

John A. Obermaier, Chicago, Ill.

Application September 20, 1933, Serial No. 690,227

2 Claims. (Cl. 136—4)

The present invention relates primarily to thermocouples, but many of the features are of general application and may be utilized in temperature responsive elements of any type. Therefore, I do not wish to be limited to the specific type of device except as set forth in the appended claims, and I desire it to be understood that certain of the features as pointed out hereinafter may be applied to other types of instruments.

Thermocouples of the type in which the present invention is embodied are often used in connection with Diesel engines for determining the exhaust temperatures in the various cylinders of the engine, or they may be used in other places where it is highly desirable or absolutely necessary to enclose the thermocouple in such a manner as to prevent access of moisture, acid, gases or the like. In such case the most desirable type of gasket is a resilient gasket of rubber or other yieldable material which effects an absolutely liquid or gas tight connection between the parts of the casing. In connecting together the parts of such casings in the prior art it has been customary to compress the gasket to such a point that the cover or casing seems quite firmly secured, but one of the disadvantages of the prior art devices lies in the fact that there can be no positive securement until a metal to metal contact is secured and there is no metal to metal contact where the gasket is interposed.

The rubber gaskets in the devices of the prior art may be liquid tight or gas tight when they are first secured in place, but the compression to which they are subjected is such that the gaskets are compressed beyond their elastic limits and cavities are formed in the gasket. Furthermore, it is practically impossible to secure the metal parts together firmly without damaging the rubber gasket and after a period of time the rubber gaskets in the devices of the prior art will inevitably leak because they have been damaged or compressed beyond their elastic limits or age has caused a permanent set.

One of the objects of the invention is the provision of an improved thermocouple or other temperature responsive device which is provided with a sealing arrangement adapted to effect a gas tight and/or liquid tight seal for long periods of time without necessity for repair or replacement and which does not damage the gaskets or compress them beyond their elastic limits, as in the devices of the prior art.

Another object is the provision of a gasket arrangement of this type in which the parts are secured together firmly by metal to metal contact notwithstanding the interposition of a sealing gasket between the adjacent metal surfaces at other points.

Another object of the invention is the provision of an improved thermocouple which is adapted to be conveniently removed for repair or for cleaning of the carbon from the well of the thermocouple. In many of the points of use of such thermocouples the well or metal casing which includes the active thermocouple element is located at a point where it may be subjected to the accumulation of carbon or other foreign material. Such carbon acts as a heat insulator, at least in some degree, and causes a lag between the change of temperature in the sphere of operation of the instrument and the indication on the instrument and therefore it becomes desirable to provide a structure from which the carbon is readily cleaned.

This cleaning operation has been quite difficult in the devices of the prior art due to the structure of the thermocouple in which the well and other elements have not been readily removable and due to the fact that the removal of the well for cleaning has been hampered by the structure of the casing.

One of the objects of the present invention is the provision of an improved thermocouple in which the well may be very quickly and conveniently removed, the removal itself effecting a cleaning of the carbon from the stem or well of the pyrometer.

Another object of the invention is the provision of an improved thermocouple structure in which the supporting head or plug with its connectors is entirely exposed when the elements of the casing have been removed so as to facilitate handling of the connections and to facilitate removal of the supporting head and well.

Another object of the invention is the provision of an improved thermocouple structure by means of which the same length of stem or well may be adjusted for use in different environments so that only one stock length of pyrometer will need be kept in stock but it may be so conveniently adjusted during its installation that the end of the thermocouple well where the juncture of the thermocouple is located may be placed exactly at the point where the temperature is to be measured.

Another object of the invention is the provision of an improved structure by means of which the pipe connection from the casing of the junction box may be turned in any convenient direction when the supporting pipe or casing is threaded home in its place of installation.

Another object is the provision of an improved electrical connector arrangement and supporting device rotatably mounted so that the connectors will be properly disposed with respect to the opening in the junction box after the supporting plug or head has been threaded home in the casing.

Other objects and advantages of the invention will be apparent from the following description and from the accompanying drawings, in which similar characters of reference indicate similar parts throughout the several views.

Referring to the two sheets of drawings accompanying this specification,

Figure 1 is a side elevational view in partial section showing a thermocouple constructed according to the present invention;

Fig. 2 is a vertical sectional view taken through the axis of the device of Fig. 1, showing the details of construction, taken on the plane of the line 2—2 of Fig. 3, looking in the direction of the arrows;

Fig. 3 is a sectional view taken on the plane of the line 3—3 of Fig. 1, showing a top plan view of the thermocouple mechanism inside the casing;

Fig. 4 is an enlarged fragmentary sectional view taken through any of the two screws of the casing of Figs. 1 and 2, showing the relation between the parts of the casing and the gasket before the cover is finally secured;

Fig. 5 is a similar view showing the parts after the cover has been firmly secured in place;

Fig. 6 is an enlarged elevational view of one of the connectors with the supporting plate of insulation in section showing the details of construction, taken on the plane of the line 6—6 of Fig. 3 looking in the direction of the arrows;

Fig. 7 is a top plan view of a modification of the type shown in Fig. 8;

Fig. 8 is a fragmentary side elevational view in partial section, showing the modification of Fig. 7; and Fig. 9 is a fragmentary sectional view similar to Fig. 2, but showing another modified form of supporting head or supporting plug.

Referring to Figs. 1 and 2, the thermocouple is indicated in its entirety by the numeral 10. It preferably comprises an enclosing metal well 11 consisting of a tube of suitable metal capable of withstanding the temperatures to which the particular thermocouple is to be subject and capable of protecting the thermocouple elements mounted in the well. The tube 11 is closed at its lower end 12 and is provided with an inner bore 13 which slidably and loosely supports the insulating members 14 which surround the wires of the thermocouple. The thermocouple comprises a pair of dissimilar metal wires 15 and 16 which are brazed, soldered, welded or otherwise suitably secured together at their hot junction 17 located at the lower end of the tube 11. The thermocouple wires 15 and 16 are insulated from each other throughout their length by being passed through the parallel bores 18 and 19 of a plurality of insulating sections 14, or any other form of heat resisting material capable of preventing the flow of electricity between wires and the structure.

The insulating members 14 comprise substantially cylindrical insulators which may be constructed of any material suitable for resisting the temperatures at which the pyrometer is to be subjected. For example, the members 14 may be constructed of a suitable type of porcelain and when the porcelain sections 14 are threaded upon the two wires 15 and 16 they support the wires in spaced relation to each other, insulated from each other and from the metal well 11. The thermocouple well 11 is preferably fixedly supported at its upper end by being secured to a supporting head or plug 20. The plug 20 may comprise a substantially cylindrical metal member which in the embodiment of Fig. 2 is provided with an outer threaded surface 21. The plug or head 20 is also provided with a bore 22 capable of receiving the tube 11 with a close frictional fit and the tube 11 may be spun over at 23 inside the counterbore 24 to secure the well or tube 11 firmly to the plug 20.

Plug 20 is also provided with an enlargement 25 having a lower flat surface 26 for engaging a gasket 27 and the periphery 28 of the plug enlargement 25 is preferably non-circular in form to permit the application of a wrench or other tool. The upper surface of the plug 20 is formed with an axially extending rib 29 which is located adjacent the edge of another counterbore 30. Counterbore 30 is adapted to receive one or more insulating fiber or bakelite plates 31, 32 which support the connectors which are indicated in their entirety by the numbers 33, 34 (Fig. 3).

The supporting insulating plate 31 may consist of a piece of fiber board of suitable thickness and strength to provide a support, the fiber board being provided with apertures 35, 36 for passage of the thermocouple wires 15 and 16. Each connector 33, 34 may consist of a metal plate having a pair of downwardly extending lugs 37, 38 as shown in Fig. 6.

The lugs 37, 38 extend through apertures in the insulating plate 31 and are riveted over at 39 on the other side to firmly secure the connector plates to the insulating support. The lower insulating plate 32 covers the rivets and prevents any possibility of contact between the rivets and any other electrical part. The entire assembly of the thermocouple, well and connectors is rotatably mounted in the counterbore 30 for the purpose of permitting the convenient location of the connectors with respect to the connecting wires. For example, the plug may be installed in a casing which is indicated in its entirety by the numeral 40 and the casing 40 is provided with an outlet 41 located at one side and having a threaded bore 42 for receiving the conduit 43.

As shown in Fig. 7, the two connector plates 33, 34 are preferably disposed in non-parallelism to each other or at an angle to each other. The purpose of this non-parallelism will appear more clearly from Fig. 3 where it will be seen that the connecting wires 44, 45 enter through the conduit 43 and when they are secured to the connectors 33, 34 there is a tendency for the wires to be spread apart at their ends when properly installed, as shown in Fig. 3. If the connectors 33, 34 were turned about so that the edges which are closest to each other are also adjacent the outlet 41, then the connector wires 44, 45 would have a tendency toward short circuiting, as they would not be spread and they would on the contrary be turned toward each other.

I prefer to mount the supporting insulating plate and connectors rotatably in the enlargement 25 for the purpose of permitting the adjustment of the connectors 33, 34 to the position of Fig. 3 in every case. When the plug 20 is provided with threads and the plug is threaded home in the threaded bore 46 of the casing 40, it is difficult and practically impossible to foresee exactly how the connectors 33 and 34 will be located, but when the connectors are rotatably mounted the plug may be threaded home and firmly secured and then the connectors may be turned around to the position of Fig. 3.

Each of the connectors 33, 34 comprises the plate 47 which is provided with a plurality of threaded bores 48. The threaded bores 48 receive the threaded screw bolts 49 which are arranged in pairs to secure two metal clamping plates to the connector plate 47. The lower clamping plate 50 has two screws 49 passing through it to clamp the upper end of one of the thermocouple wires against the plate 47 to effect a permanent electrical connection. The other clamping plate 51 has two screw bolts 49 passing through it to clamp one of the connecting wires 44 or 45 against the plate 47 and to effect a permanent electrical connection between the thermocouple and other indicating devices, such as the meter which is usually employed for measuring the resulting electromotive force.

In order to provide for the convenient removal of the thermocouple from its supporting head 20 I prefer to secure the insulating plates 31, 32 in the counterbore 30 by merely riveting over a plurality of points of the upwardly projecting rib 29, so that several lugs formed out of the rib 29 extend over the insulating plate 31, as shown at 52 (Fig. 2). The lugs 52, preferably three in number, support the insulating plates 31, 32 in the counterbore 30, but permit their rotation and if it becomes necessary to remove the thermocouple from its head and well, it is a simple matter to remove the lugs 52 and there is still sufficient material of the rib 29 to effect a securement again when these parts are again reassembled.

The casing 40 is preferably so constructed that only one type of casing and one type of well need be carried in stock, adjustable supporting sleeve or tube 53 being employed to make the well of suitable length. It is often desirable to locate the end of the well 12 or the hot junction 17 of the thermocouple exactly at the middle of a pipe or at some point where measurement of the temperature is desired. In order to provide instruments for all conditions it would be necessary to have a multiplicity of wells of different lengths which would involve the carrying of a large stock of wells of different lengths and would not yet quite achieve the result desired, as the stock wells might not be of the exact length desired.

I prefer to utilize one well and thermocouple of definite length and a supporting pipe or tube 53 which may be made of suitable length to properly locate the hot junction. The supporting tube 53 preferably consists of a metal member, the outer surface 54 of which may be non-circular such as hexagonal to permit the application of wrenches and other tools. The lower end of the supporting tube 53 is provided with a reduced threaded surface 55 preferably provided with a pipe thread so that it may be threaded home in the cylinder pipe or other device to which the pyrometer is applied. The upper end of the supporting tube 53 is provided with a reduced threaded portion 56 for engagement in the threaded bore 57 of the casing 40 and the threaded portion 56 is preferably provided with a standard thread as it is not intended to be threaded home in the casing. A locking nut 58 is provided on the upper threaded end 56 for the purpose of engaging the lower flat surface 59 on the casing so that the supporting tube 53 may be threaded into any desired position in the casing 40 and secured there by means of the nut 58.

Thus the supporting tube 53 may be made of any effective length within the range of the threaded portion 56 and the foregoing structure also accomplishes the purpose of permitting the location of the outlet opening at any side of the apparatus.

For instance, there may be parts of the machinery which would interfere with the location of the pipe 43 and outlet 41. If the threaded end 56 of the supporting tube 53 had to be threaded home in the bore 57 then the outlet 41 might point in the wrong direction, but with the present structure it is possible to turn the outlet 41 in any direction in its circle of movement upon the threaded end 56 and secure it there by means of the lock nut 58 which also permits the locking with the tube 53 of any effective length.

The tube 53 is preferably provided with a bore 60 of sufficient size to pass the well 11 with clearance but the lower end of the tube 53 is provided with a smaller bore 61 effecting a substantial fit with the well 11. The lower end of the supporting tube 53 is provided with a sharp shearing edge 62 immediately adjacent the metal well 11 and the end surface 63 is curved outwardly or tapered so as to loosen and spread the carbon which is sheared from the well 11 by the sharp shearing edge 62.

Thus the bore 61 slidably supports the well 11 and when the well 11 is withdrawn from the supporting tube 53 the shearing edge 62 engages the outer surface of the well 11 and scrapes off the carbon or other foreign material which is broken up by the camming surface 63 falling back in the cylinder from whence it may be discharged through the exhaust.

As this carbon or other material may be quite hard and difficult to remove, I prefer to provide the supporting head 20 with the threaded portion 21 which acts in conjunction with the threaded bore 46 to provide a force multiplying means for withdrawing the well. For example, when the plug 20 is turned in a counterclockwise direction in Fig. 2, the well 11 which is secured to the plug 20, is forcibly withdrawn while the shearing edge 62 scrapes off the carbon. When the plug 20 has been withdrawn far enough so that its threads no longer engage, a prying member such as a pinch bar, chisel or the like, may be inserted under the flat annular surface 26 to pry the plug 20 upward the remainder of the distance until the well is completely removed. This removal is also made convenient by the arrangement of the parts of the casing 40 which are so arranged that the entire casing or cover is removed and the head and connectors are completely exposed in the preferred embodiment of the invention.

The casing 40 preferably comprises a cast metal member which is formed with a base 64. The base 64 has the threaded bore extending outwardly in the downward direction. It also has the recess 65 formed at one side and communicating with the threaded bore 42 which extends outwardly in a lateral direction. Bore 57 is used to support the thermocouple while bore 42 is used to support the conduits for the connecting wires.

The upper surface 66 of the base is preferably flat and provided with a multiplicity of threaded apertures 67 (Figs. 4 and 5) for receiving the screw bolts 68 which secure the cover in place. The area of the flat surface 66 is sufficiently large to provide for the engagement with a gasket which completely surrounds the openings 57 and 69 in the top of the base.

The cover 70 preferably comprises a recessed cast metal member which is oblong in shape and provided with a chamber or recess 71 of sufficient size to enclose the connectors and wires without contacting them. Cover 70 is provided with a lower flat surface 72 for engaging the gasket and formed on the lower side of a radially outwardly extending cover flange 73. The cover flange 73 is provided with apertures 74 registering with the threaded bores 67 in the base for receiving screw bolts 68. Either the base flange 75 or the cover flange 73 is preferably provided with metal lugs or pins 76 of predetermined height projecting out of the seating surfaces 66, 72. In the present embodiment the lugs 76 (Fig. 5) are located on the base flange 75, but they might be located with equal facility on the lower side of the cover flange 73. Each lug 76 comprises a pin which is preferably provided with a flat head 77 and a cylindrical stem 78 which is driven into a bore 79 in flange 75. At their outer ends 80 the pins or lugs 76 are riveted over to secure them in place. The head 77 of the pin or lug 76 projects above the gasket seat or surface 66 to a distance which predetermines the thickness of the gasket when the cover is secured in place.

The gasket 81 preferably comprises a yieldable and/or resilient sealing member such as a rubber gasket of suitable width to permit the formation of holes to receive the heads and holes to receive the screw bolts 68 and still leave enough gasket material on each side of these holes to produce a liquid tight and gas tight seal between the cover and base. The rubber gasket is preferably considerably thicker than the height or thickness of the heads 77 (Fig. 5) and when the gasket is first put in place the relation of the parts is shown in Fig. 4. It will be observed in Fig. 4 where the screws have not yet been driven home, and the gasket is not yet compressed that the gasket is thicker by one-half than the head 76. In other words, the head 76 projects up about two thirds of the thickness of the gasket. This proportion between the heads and gaskets' thickness is arbitrarily selected in view of the elasticity of the particular gasket employed and I desire it to be understood that these proportions would be varied depending upon the resiliency, stiffness or elasticity of the gasket. When the screw bolts 68 are threaded home uniformly all about the edges of the cover 70 the cover flange 73 may have its lower surface brought into firm engagement with the tops of the lugs 76. There is a metal to metal contact between the cover and the base under these conditions and the cover may be firmly secured so that it will never come loose under operation.

The lugs 76 prevent the cover from crushing the gasket 81 beyond its elastic limit and lugs 76 prevent the formation of cavities in the gasket. In other words, the gasket will still resiliently engage the base and cover flanges when the cover is secured in place and it will tend to produce a gas tight and liquid seal for a long period of time, whereas the gaskets of the prior art would tend to become loose because the gaskets were crushed beyond their elastic limit. The lugs or pins 76 are preferably uniformly spaced about the periphery of the base so that all parts of the cover flange 73 and base flange 75 are uniformly spaced and the gasket is uniformly compressed. In some embodiments of the invention different forms of lugs or pins may be used, such as an integral upwardly projecting border flange or integral projecting lugs.

It will thus be observed that I have invented an improved form of thermocouple assembly in which the mechanism will be protected against the ingress of liquid, acids or corroding gases for a long period of time. Such liquids or gases might either corrode the connections or eventually short circuit them and the disadvantages of the arrangements of the prior art in which the gasket finally became loose, have been completely overcome by the foregoing arrangement. The present structure is also conveniently adapted to permit removal of the well and cleaning of the carbon or other foreign material from the surface of the well and to permit the arrangement of the connectors so that there will be no short circuits. The length of the well may be adjusted by the use of supporting tubes of different lengths without carrying a great many different wells or instruments in stock and the outlet from the junction box may be arranged to extend in any convenient direction while still firmly securing the instrument in place by threading it home upon the device where it is installed.

Referring to Fig. 8, this is a modification in which the supporting head 82 may be similar in form to that previously disclosed, but the insulating plates 31, 32 are secured to the head 82 by means of screw bolts 83 which pass through the plates 31, 32 and are threaded into bores 84 in the plug 82. Such an arrangement does not permit adjustment of the insulating plates 31, 32 rotatively to every position, but they may be adjusted by steps. For example, when two screws 83 are used the adjustments are by steps of 180° and if four screws are used adjustments would be by steps of 90°. By the use of six screws an adjustment may be effected which is equal to 60° of rotation, but the amount of adjustment secured is limited by the necessity for additional work and expense in providing additional threaded bores and screws and therefore the embodiment of Figs. 1 and 2 is preferred.

Referring to Fig. 9, this is a modification which is similar to those previously described except for the fact that the outer surface 85 of the supporting plug 86 is not threaded, but is cylindrical and fits in a complementary cylindrical bore. In such case the screw bolts 87 may pass not only through the insulating plates 31, 32 but through bores 88 in the plug 86, thereby securing the supporting plug or head 86 to the base 89.

While I have illustrated a preferred embodiment of my invention, many modifications may be made without departing from the spirit of the invention and I do not wish to be limited to the precise details of constructions set forth but desire to avail myself of all changes within the scope of the appended claims.

Having thus described my invention, what I claim is new and desire to secure by Letters Patent of the United States is:

1. In a thermocouple the combination of a supporting base having a threaded bore with a supporting head having a complementary threaded portion, a protecting well carried by said head, a thermocouple in said well, an insulating member for supporting said thermocouple element and supporting electrical connectors, said insulating member being rotatively mounted in said head to permit convenient adjustment of the position of said connectors, said head having a counterbore for receiving said insulating member and said head having integral portions extending over the top of said insulating member.

2. In a pyrometer the combination of a supporting base having a threaded bore with a supporting head having a complementary threaded portion, a protecting well carried by said head, a thermocouple element in said well, an insulating member for supporting said thermocouple and supporting electrical connectors, said insulating member being rotatively mounted in said head to permit convenient adjustment of the position of said connectors, said head having a counterbore for receiving said insulating member and said head having integral portions extending over the top of said insulating member, said connectors being carried by said insulating member at an acute angle to each other in such a manner as to spread the parts of the conductors which are joined to said connectors.

JOHN A. OBERMAIER.